United States Patent
Bosko et al.

(10) Patent No.: US 9,917,818 B2
(45) Date of Patent: *Mar. 13, 2018

(54) MULTI-TENANT SECURE SEPARATION OF DATA IN A CLOUD-BASED APPLICATION

(71) Applicant: International Business Machines Corporation, Armonk, NY (US)

(72) Inventors: Christopher Michael Bosko, Durham, NC (US); Bryan Daniel Osenbach, Cary, NC (US); Jeffrey S. Sloyer, Cary, NC (US); Chelsea Christine Beerse, Fairport, NY (US)

(73) Assignee: International Business Machines Corporation, Armonk, NY (US)

( * ) Notice: Subject to any disclaimer, the term of this patent is extended or adjusted under 35 U.S.C. 154(b) by 663 days.

This patent is subject to a terminal disclaimer.

(21) Appl. No.: 14/503,146

(22) Filed: Sep. 30, 2014

(65) Prior Publication Data
US 2015/0381590 A1    Dec. 31, 2015

Related U.S. Application Data

(63) Continuation of application No. 14/319,123, filed on Jun. 30, 2014, now Pat. No. 9,553,850.

(51) Int. Cl.
*G06F 17/30* (2006.01)
*H04L 29/06* (2006.01)
*G06F 9/455* (2018.01)

(52) U.S. Cl.
CPC ...... *H04L 63/0428* (2013.01); *G06F 9/45558* (2013.01); *H04L 63/0478* (2013.01);
(Continued)

(58) Field of Classification Search
CPC .............. H04L 63/0428; H04L 63/061; H04L 63/0478; G06F 9/45558; G06F 2009/45595; G06F 2009/45587
(Continued)

(56) References Cited

U.S. PATENT DOCUMENTS 9,116,888 B1 *  8/2015  Wang ..................... G06F 17/30
2011/0302415 A1  12/2011  Ahmad et al.
(Continued)

FOREIGN PATENT DOCUMENTS

GB              2382756 B       4/2003

*Primary Examiner* — Evan Aspinwall
(74) *Attorney, Agent, or Firm* — David B. Woycechowsky; David H. Judson; Jeffrey S. LaBaw

(57) ABSTRACT

Multi-tenant and single-tenant methodologies are blended into a single solution to provide cost savings of multi-tenancy along with data security and privacy of a single-tenant environment. The cloud infrastructure is partitioned to include a first set of servers, and a second set of servers. The first set of servers are dedicated to a first operation, such as data presentation, while the second set of servers are dedicated to a second operation, such as data processing. The first set is operated in a multi-tenant operating mode, while the second set is operated in a single-tenant operating mode. Thus, the first set is available for general use, presenting data from any of the server(s) in the second set. The second set, in contrast, is dedicated to individual tenants. Preferably, each tenant has dedicated server(s) in the second set, which functions like a traditional, single-tenant environment providing inherent security and privacy guarantees.

7 Claims, 5 Drawing Sheets

(52) U.S. Cl.
CPC .. *H04L 63/061* (2013.01); *G06F 2009/45587* (2013.01); *G06F 2009/45595* (2013.01)

(58) Field of Classification Search
USPC .......................................................... 707/691
See application file for complete search history.

(56) References Cited

U.S. PATENT DOCUMENTS

| | | | |
|---|---|---|---|
| 2012/0281706 A1* | 11/2012 | Agarwal | H04L 67/1002 370/395.53 |
| 2013/0145179 A1* | 6/2013 | Rangegowda | G06F 21/602 713/193 |
| 2014/0215465 A1* | 7/2014 | Elzur | G06F 9/45533 718/1 |

\* cited by examiner

MULTI-TENANT SECURE SEPARATION OF DATA IN A CLOUD-BASED APPLICATION

BACKGROUND OF THE INVENTION

Technical Field

This disclosure relates generally to securing information in a cloud computing or other shared deployment environment wherein disparate parties share Information Technology (IT) resources.

Background of the Related Art

An emerging information technology (IT) delivery model is cloud computing, by which shared resources, software and information are provided over the Internet to computers and other devices on-demand. When multiple parties share resources within a cloud computing and other such shared deployment model, a compelling transformation and reduction in their IT costs (from fixed to variable) can be achieved. Using this approach, companies can extend computing and storage capacity elastically to match demand, shift operational and capital costs to an external data center, free IT staff to focus on new projects, and more. Cloud compute resources are typically housed in large server farms that run networked applications, typically using a virtualized architecture wherein applications run inside virtual servers, or so-called "virtual machines" (VMs), that are mapped onto physical servers in a data center facility.

Emerging cloud environments are being created out of existing IT infrastructures that are being adapted to support cloud-based services. One key characteristic of cloud computing that is different from existing environments is the requirement for so-called "multi-tenant" support, sometimes referred to as multi-customer single deployment. To satisfy this requirement, service providers have to be able to isolate different customer usage of the cloud services. Indeed, typically one of the most significant barriers keeping an enterprise customer from utilizing such resources is the ability to gauge a provider's security posture in relation to its own security compliance requirements.

In particular, shared environments have the potential to expose unprotected data to malicious attacks, hacking, and introspection by third parties, both intentional and otherwise. The service provider thus needs to maintain isolation between and among their specific customers that are sharing cloud resources. Thus, such systems need to ensure end-to-end trust and security of customer data regardless of their underlying networks, platforms, virtualization mechanism or middleware. Some of these problems can be addressed by the isolation of data and resources, and the use of VPNs and other such access mechanisms, but many cloud datacenters use non-traditional physical network configurations that negate traditional network isolation and that complicate VPN keying techniques.

Most companies that desire to use cloud computing and other shared deployment models assign high value to their data and applications. One approach to preserving confidentiality in the multi-tenant operating environment involves encryption of data on a per-tenant basis within such shared/cloud infrastructure. In one proposal, the tenants in the multi-tenant shared deployment are provided their own distinct key spaces over which they control a key management system. In this manner, virtual key management domains are created on a per-tenant (per-customer) basis so that, whenever a particular customer's data is co-tenanted, stored, transmitted or virtualized in the IT infrastructure of the provider's datacenter(s), it is secured using key management materials specific to that customer. This assures that the entirety of a tenant's data (including, without limitation, all generic data, and software applications) remains secure by cryptographically isolating it from other tenants' applications.

While the above-described approach is quite useful, there remains a need for additional techniques that provide for secure data separation in a cloud based application.

BRIEF SUMMARY

According to this disclosure, multi-tenant and single-tenant methodologies are blended into a single solution to provide both the cost savings of multi-tenancy along with the data security and privacy associated with a single-tenant environment. To this end, the cloud infrastructure is partitioned to include a first set of servers, and a second set of servers distinct from the first set. With respect to a particular cloud application (the "product/service") that will be shared, the first set of servers are then dedicated to a first operation, such as data presentation, while the second set of servers are dedicated to a second operation, such as data processing. The first set of servers is operated in a multi-tenant operating mode, while the second set of servers is operated in a single-tenant operating mode. In other words, the first set of servers is available for general use, presenting data from any of the server(s) in the second set. This is a traditional multi-tenant approach. The second set of servers, in contrast, is dedicated to individual tenants. Because each tenant has its own dedicated server(s) in the second set (scaled as needed), these servers function like a traditional, single-tenant environment providing the inherent security and privacy guarantees that are associated therewith. In addition to this bifurcated server approach, the solution includes a client component for interacting with the server components. The client component negotiates secure encryption keys with the data processing servers for all data-specific functions and requirements of the product/service. For all non-data-specific actions and requirements, the first (data presentation) servers are used. Data flow among the first set of servers, the second set of servers, and the client component are secured using an encryption layer.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
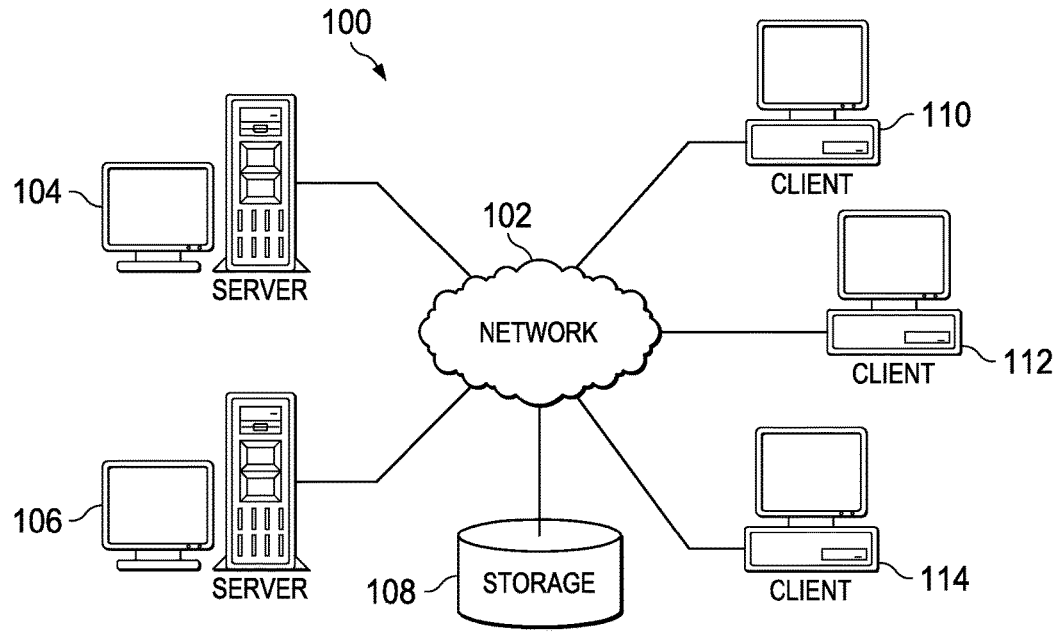
FIG. 1 depicts an exemplary block diagram of a distributed data processing environment in which exemplary aspects of the illustrative embodiments may be implemented.
Figure 2:
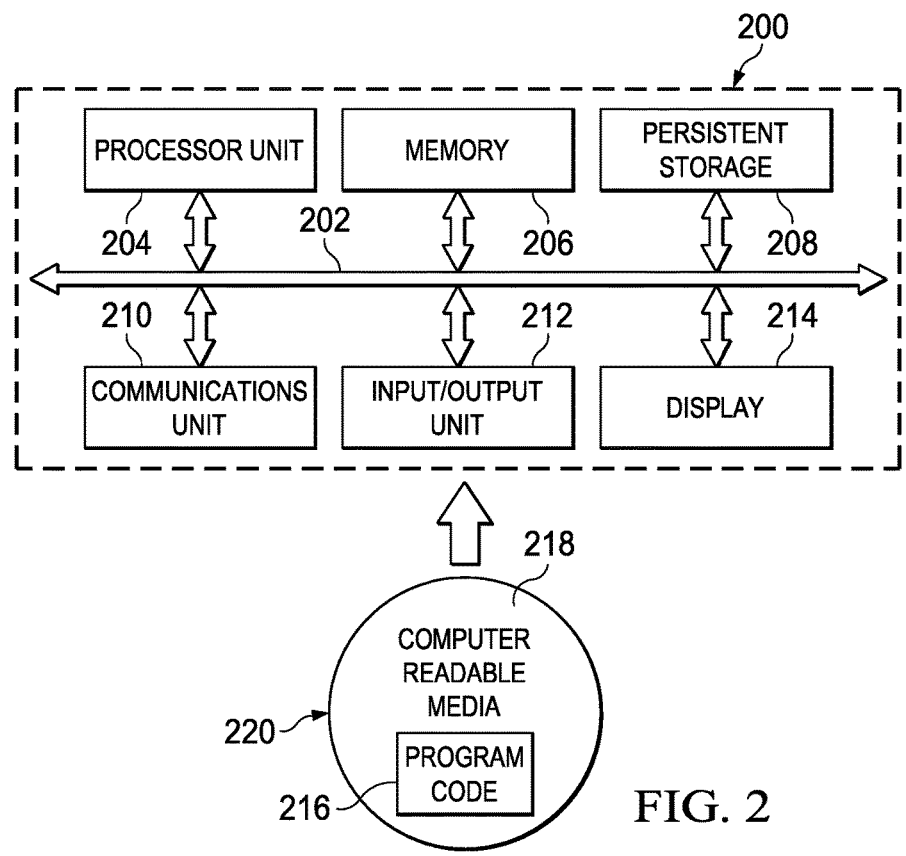
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the subject matter.

Client-Server Technologies

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the disclosed subject matter may be written in any combination of one or more programming languages, including an object-oriented programming language such as Java™, Smalltalk, C++, C#, Objective-C, or the like, and conventional procedural programming languages. Program code may be written in interpreted languages, such as Python. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The techniques herein may also be implemented in non-traditional IP networks.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party, and it may be on-premises or off-premises.

Community cloud: the cloud infrastructure is shared by several organizations and supports a specific community that has shared concerns (e.g., mission, security requirements, policy, and compliance considerations). It may be managed by the organizations or a third party and may be on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
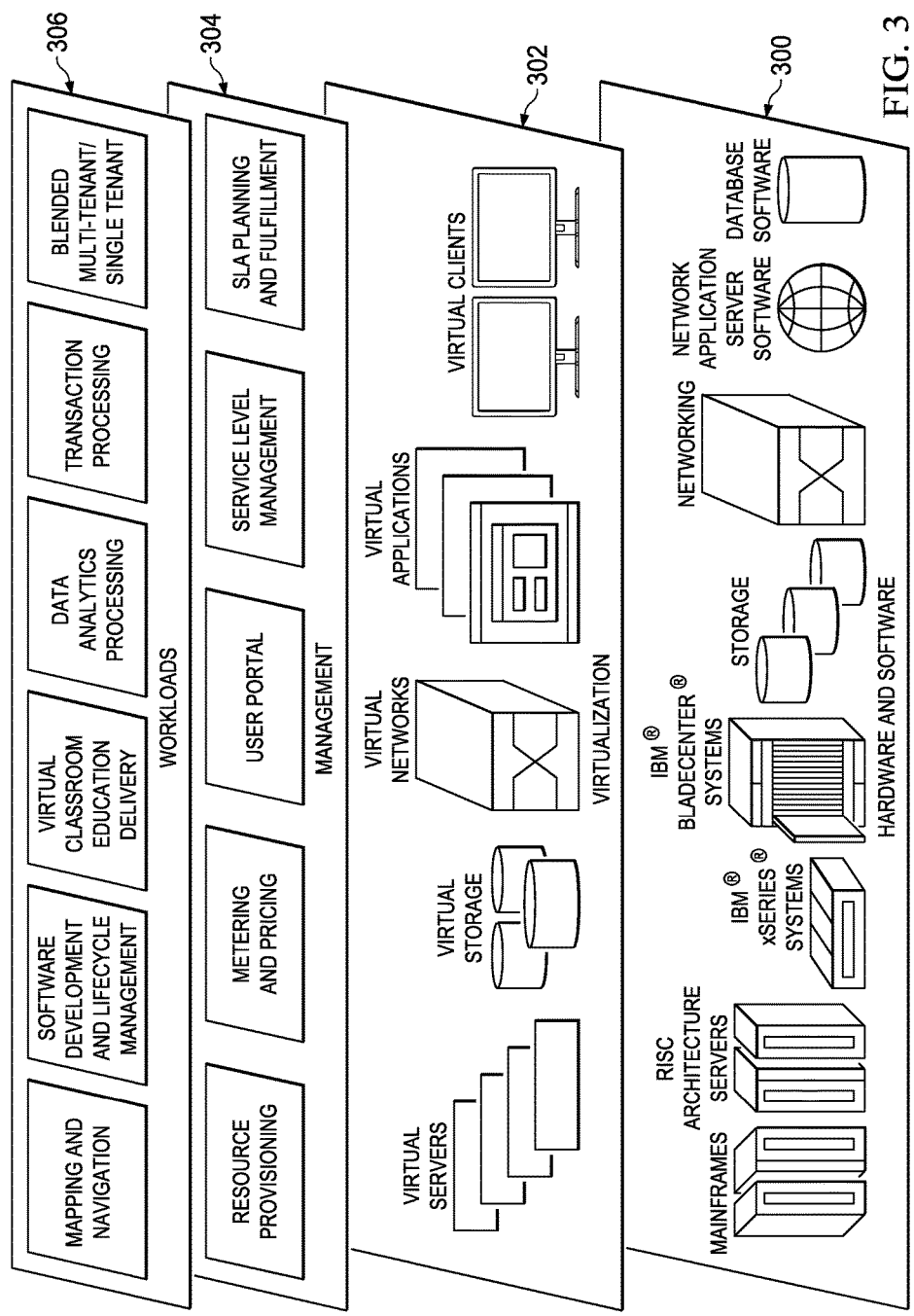
FIG. 3 illustrates an exemplary cloud computing architecture in which the disclosed subject matter may be implemented.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; and, according to this disclosure, a blended multi-tenant/single-tenant (or "partitioned server") solution as described herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Figure 4:
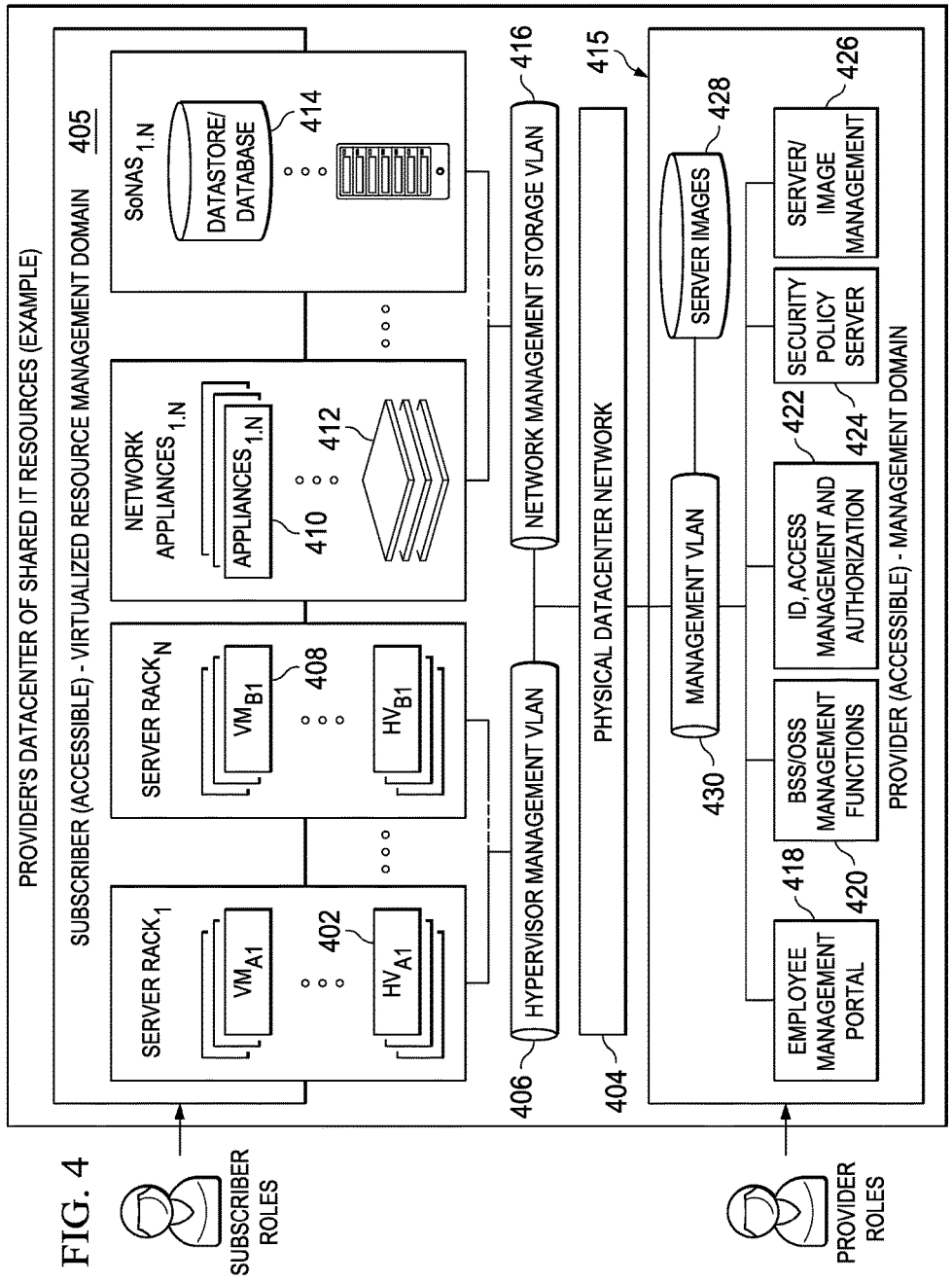
FIG. 4 illustrates an exemplary datacenter in which the server partitioning scheme of this disclosure may be implemented.

FIG. 4 illustrates a typical IT infrastructure that supports virtualization of resources. For purposes of explanation, the IT datacenter that provides shared (public) resources is the "provider" and a customer or company that uses these shared resources to host, store and manage its data and applications (in all forms) is the "subscriber" (or "customer" or "tenant"). In FIG. 4, an example virtual machine hosting environment (alternately referred to herein as a data center or "cloud") is illustrated. This environment comprises host machines (HVs) 402 (e.g., servers or like physical machine computing devices) connected to a physical datacenter network 404, typically via a hypervisor management VLAN 406. Although not depicted explicitly, typically the environment also includes load balancers, network data switches (e.g., top-of-rack switches), firewalls, and the like. As shown in FIG. 4, physical servers 402 are each adapted to dynamically provide one or more virtual machines (VMs) 408 using virtualization technology. Such technology is available commercially, e.g., from VMware® or others. Server virtualization is a technique that is well-known in the art. As depicted, multiple VMs can be placed into a single host machine and share the host machine's CPU, memory and other resources, thereby increasing the utilization of an organization's data center. In this environment, tenant applications 410 are hosted in network appliances 412, and tenant data is stored in data stores and databases 414. The applications and data stores are connected to the physical datacenter network 404, typically via a network management/storage VLAN 416. Collectively, the virtual machines, applications and tenant data represent a subscriber-accessible virtualized resource management domain 405. Through this domain, the subscriber's employees may access and manage (using various role-based privileges) virtualized resources they have been allocated by the provider and that are backed by physical IT infrastructure. The bottom portion of the infrastructure illustrates a provider-accessible management domain 415. This domain comprises a provider employee management portal 418, the BSS/OSS management functions 420, various identity and access management functions 422, a security policy server 424, and management functions 426 to manage the server images 428. These functions interface to the physical datacenter network via a management VLAN 430. The provider's employees have specialized privileges (and perhaps specific clients/networks) from which they have access to the Operational and Business Support Services (OSS/BSS) that they use to manage the IT datacenter infrastructure (e.g., hardware and software installations, configurations, monitoring, technical support, billing, and the like).

Generalizing, the cloud computing infrastructure provides for a virtual machine hosting environment that comprises host machines (e.g., servers or like physical machine computing devices) connected via a network and one or more management servers. Typically, the physical servers are each adapted to dynamically provide one or more virtual machines using virtualization technology, such as VMware ESX/ESXi. Multiple VMs can be placed into a single host machine and share the host machine's CPU, memory and other resources, thereby increasing the utilization of an organization's data center. Among other tasks, the management server monitors the infrastructure and automatically manipulates the VM placement as needed, e.g., by moving virtual machines between hosts.

In a non-limiting implementation, representative platform technologies are, without limitation, IBM System x® servers with VMware vSphere 4.1 Update 1 and 5.0.

Partitioned Servers for Secure Separation of Data in a Cloud Based Application

With the above as background, the subject matter of this disclosure is now described.

Figure 5:
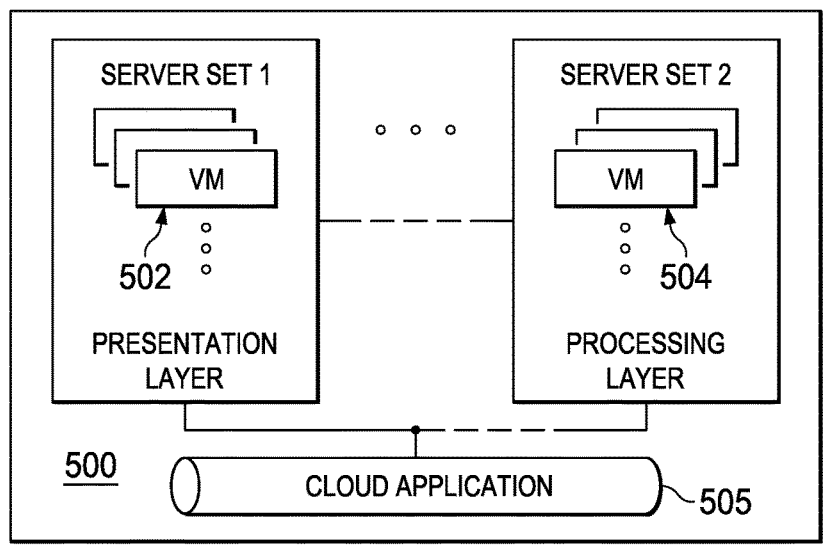
FIG. 5 illustrates that datacenter of FIG. 4 that includes the first and second set of servers.
Figure 5:

According to this approach, multi-tenant and single-tenant methodologies are blended into a single integrated solution to provide both the cost savings of multi-tenancy along with the data security and privacy associated with a single-tenant environment. To this end, and as seen in FIG. 5, the cloud infrastructure 500 (such as shown in FIG. 4) is partitioned to include a first set of servers 502, and a second set of servers 504 distinct from the first set. With respect to a particular cloud application (the "product/service") that will be shared, the first set of servers 502 are then dedicated to a first operation, such as data presentation, while the second set of servers 504 are dedicated to a second operation, such as data processing. According to this disclosure, the first set of servers 502 is operated in a multi-tenant operating mode, while the second set of servers 504 is operated in a single-tenant operating mode. In other words, the first set of servers is available for general use, presenting data from any of the server(s) in the second set. This is a traditional multi-tenant approach. The second set of servers, in contrast, is dedicated to individual tenants using the cloud application. Because each tenant has its own dedicated server(s) in the second set (scaled as needed), these servers function like a traditional, single-tenant environment providing the inherent security and privacy guarantees that are associated therewith. In addition to this partitioned (or bifurcated) server approach, the solution includes a client component 506 for interacting with the server components. As will be described, and depending on the encryption layer implemented, the client component 506 negotiates (or otherwise obtains) secure encryption keys so that interactions among the entities (client component, data presentation server and data processing server) are secure. More specifically, all data flow among the first set of servers, the second set of servers, and the client component are secured using an encryption layer that provides one or more techniques to secure the data, such as session-specific encryption between the client component and the data processing servers, tenant-specific encryption for the tenant's data, or the like.

Preferably, the client component negotiates secure encryption keys with the data processing servers (the second set) for all data-specific actions and requirements of the cloud application. For all non-data-specific actions and requirements (namely, the presentation actions/requirements), the first servers are used. Preferably, all data living in the first servers is also encrypted.

Generalizing, the servers in the "first set of servers" are sometimes referred to herein as "data presentation servers" because they provide the data presentation functions that are required by the cloud application. This is akin to providing a web-based front-end to a web application. The data presentation operations may be said to take place in the "data presentation layer" (or a data presentation "service") that is operating as a multi-tenancy. The servers in the "second set of servers" are sometimes referred to herein as "data processing servers" because they provide the data processing functions that are required by the cloud application. This is akin to provide an application or database (or middleware) layer to a web application. The data processing operations may be said to take place in the "data processing layer" (or data processing "service") that is operating as a single-tenancy, i.e., with a unique tenant-to-server(s) association.

A server partitioning scheme described herein is applied with respect to a particular cloud-based application. The underlying cloud resources themselves may be allocated in any manner by the cloud service provider. Thus, with respect to the particular cloud-based application that is accessible and shared by multiple tenants, once the servers are provisioned (allocated) in the first (presentation) and second (processing) layers, typically those servers remain in such allocation. In other words, if a particular server is assigned to the first set as one of the presentation servers, that particular server does not get used in the second set (at least until it is de-provisioned from the first set). Thus, a useful way to think about the server partitioning scheme is that there is an available pool of servers in the overall cloud infrastructure (or some portion thereof). Those servers are partitioned into the first and second sets with respect to a particular cloud application. The partitioning (i.e., the identity of which servers are in the first set and/or the second set) may vary with respect to another cloud application. Thus, a server in the first set for a first application may be assigned to the second set for a second application.

The terms "presentation" and "processing" as used herein to describe the server sets should be broadly construed. Typically, the presentation layer will involve how data is received and returned to the requesting client. The processing layer, in contrast, involves how data received via the presentation layer is processed to generate responsive information that also is returned via the presentation layer.

Further, while the server partitioning scheme will involve at least first and second server sets, there may be additional "layers" of processing and thus, one or more additional "sets" of servers allocated to the cloud application.

The servers in a particular set of servers may be allocated in an off-line or static manner (e.g., at the beginning of a time period and/or before being assigned to the cloud application), or the allocation/assignment process (of a particular server) may occur dynamically (e.g., upon receipt of a request to the cloud application). Thus, the allocation/assignment of servers to the sets (or the de-provisioning/de-allocation) may be implemented statically (manually), automatically or programmatically, in advance, or on-demand (on-the-fly).

Typically, a "server" of the first set of servers or the second set of servers is a virtual machine (VM) instantiated in the cloud compute infrastructure in a well-known manner. Thus, a VM operating as a first server may be shared by multiple tenants, whereas a VM operating as a second server is tenant-specific.

Figure 6:
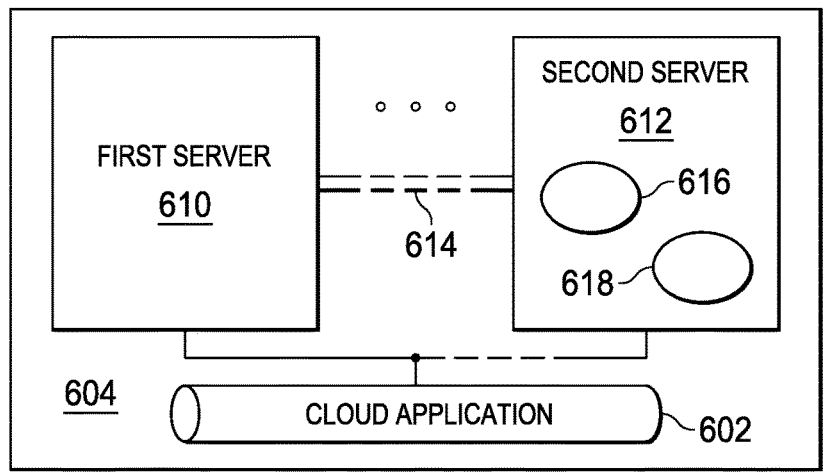
FIG. 6 illustrates interactions among the client and server component entities according to this disclosure.
Figure 6:
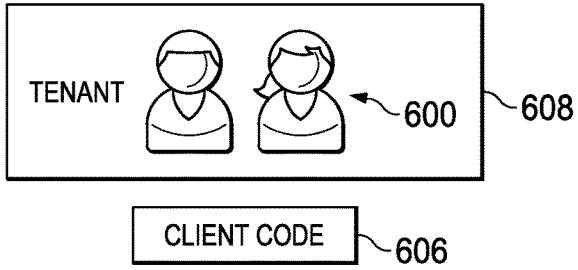

Preferably, and as noted above, data flow among the three (3) components (a data presentation server in the first layer, a data processing server in the second layer, and the client component) preferably is secured. Referring now to FIG. 6, the end-to-end encryption is now illustrated and described in more detail. In this example, the client 600 seeks to interact with the cloud application 602 that is supported in the cloud infrastructure 604 such as described above in FIGS. 3-4. The cloud compute infrastructure (FIG. 4) supports one or more other cloud applications (not shown). Multiple tenants access the cloud applications, and multiple tenants often access the same cloud application, such as application 602. Individual tenant users are clients to the cloud application. The client includes the client component 606 as previously described to render the product/service (the cloud application) to the client 600. The user of the client is associated with the tenant 608, which is one of the multiple tenants using the cloud infrastructure 604. In this embodiment, the cloud application presentation layer is supported on the first server 610, and the cloud application processing layer is supported on the second server 612. The first server 610 has been assigned by the service provider as a data presentation layer, and the second server 612 has been assigned by the service provider as a data processing layer. The first server 610 is one of a first set of servers, and the second server 612 is one of a second set of servers, as has been described above. As noted, the first server 610 is available for general use, presenting the data from any server or server(s) in the second set (including second server 612). For all data-specific actions and requirements of the application, the client component 606 interacts with the first server 610. In contrast, for all non-data-specific actions and requirements of the application, the client component 606 interacts with the second server 612.

While the first server 610 is shared as a multi-tenant resource, data living in the first server is encrypted. Data flow between the first server 610 and the second server 612 (and, more generally, between the presentation and processing layers) is secured over secure link 614. To preserve and enforce the end-to-end encryption, in one embodiment the client component 606 negotiates with the second server 612 (the one dedicated to the tenant) to obtain an encryption key 616 for a particular client session. Prior to obtaining the session-specific encryption key 616, the user must log into the service, perform an authentication, and (if required) establish that the user is authorized (on behalf of the tenant). The authentication and/or tenant authorization steps may be carried out in whole or in part by the second server 612, or by other systems and services in the cloud infrastructure. The particular manner by which the user obtains the session-specific encryption key 616 is not a limitation. This key secures any and all communications between the client component and the second server for the session, and this session-specific key also preferably is used to secure communications between the second server and any of the first servers that are involved in the session. In an alternative embodiment, instead of the client component negotiating with the data processing server to obtain the session-specific encryption key directly, a tenant-specific key 618 is retrieved by the data processing server and then provided to the client component. Tenant-specific keys typically are generated in advance (or external to the cloud application request-response workflow); a tenant-specific key 618 is designed to be shared between or among the components across one or more sessions involving the client component and the first and second servers. In this way, the session is only able to read data from the specific tenant, as other tenant data would then be encrypted with a different key (and thus be indecipherable). Without limitation, one way of generating such tenant-specific keys is to use a broadcast encryption (BE) protocol to form virtual key management domains on a per-tenant (per-customer) basis. The tenant-specific key 618 also preferably secures the communications between the first and second servers as in the embodiment using the session-specific encryption key. Encryption involving techniques other than session-specific encryption and tenant-specific encryption may be utilized; in yet another alternative, both session-specific and tenant-specific encryption may be used, with the former providing an additional encryption wrapper around data protected by the tenant-specific encryption.

Generalizing, there may be additional layers of encryption around the session-specific or tenant-specific keys as needed or desired. While the types and characteristics of the cryptographic techniques that may be employed may be quite varied, public key cryptography (PKC) solutions that implement key generation and verification using conventional algorithms (such as RSA, Diffie-Hellman, and the like) with standard key lengths provide an efficient and secure way to implement the end-to-end encryption layer.

Figure 7:
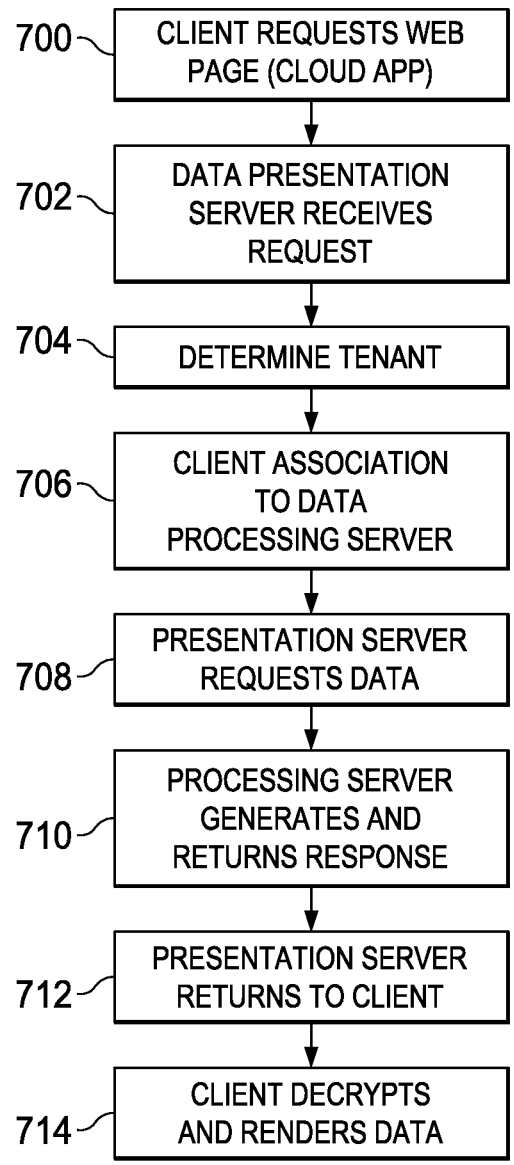
FIG. 7 is a process flow illustrating a client-cloud application interaction using the partitioned server framework of this disclosure.

FIG. 7 describes a set of client component/cloud application interactions using the partitioned server infrastructure and security protocol described. The interactions begin at step 700 when the client requests a web page associated with the cloud application. At step 702, a data presentation server receives the request. At step 704, the system determines the tenant with which the client is associated. Conventional role-based access control (RBAC) techniques may be used for this purpose. The routine then continues at step 706 with the client being associated with a data processing server; during this association, the client and data processing server either (negotiate an encryption key (if session-specific encryption is used), or the data processing server retrieves from a data store and provides the client the encryption key for the tenant (if tenant-specific encryption is used). At step 708, the data presentation server, having received the page request from the client, requests encrypted data from the data processing server. The data processing server creates and sends a response back to the data presentation server client at step 710. At step 712, the data presentation server creates and sends a response back to the client, preferably using encrypted data that the data presentation server received from the data processing server. At step 714, the client, using the encryption key negotiated with (or otherwise obtained from) the data processing server in step 706, decrypts the response to obtain the data therein. The client then renders the response (using the decrypted data) at step 716.

As a further example scenario, assume a tenant user logs into the application, such as IBM Sametime® Meetings, LotusLive®, or the like. After the user authenticates successfully, and upon confirming authorization (i.e., that the user belongs to the tenant), a session is established between the user's client component and the data presentation server(s) that will be assigned to the data processing. Once the connection is established, the data presentation server requests any and all data that is needed for the session. That data is requested from the dedicated data processing server that is associated with the tenant. Meanwhile, the data presentation server may be used by other tenants since it is acting as a shared resource in the multi-tenancy layer.

The subject matter described herein has significant advantages over the prior art. The partitioning of the servers provides a way to blend a multi-tenant shared deployment for data presentation operations while ensuring the privacy and security guarantees afforded by the single-tenant approach used for actual data processing. In this way, sensitive data processing operations are carried out on tenant-dedicated servers running in the second set, while the presentation layer (for the cloud application) is shared and implemented across the shared set of servers. The approach further ensures data privacy by implementing end-to-end encryption across all participating components, including through the shared presentation layer. With the server partitioning and encryption scheme described herein, there is no requirement or need for the presentation layer to embed (in returned responses) any special or dedicated artifacts that the client would then have to use to contact the data layer directly (e.g., via SOAP or some REST-based API). Using the approach, one tenant's data is separated from another tenant's data safely and securely.

As has been described, the functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

Still more generally, the subject matter described herein can take the form of an entirely hardware embodiment, an entirely software embodiment or an embodiment containing both hardware and software elements. In a preferred embodiment, each of the client and server components is implemented in software, which includes but is not limited to firmware, resident software, microcode, and the like. Furthermore, the components and related functions can take the form of a computer program product accessible from a computer-usable or computer-readable non-transitory medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk—read/write (CD-R/W) and DVD. Storage devices may include removable media, such as SD cards. The computer-readable medium is a tangible, non-transitory item. Any of these devices can be used to store information protected by a VMKS.

Any cloud datacenter resource may host first or second server component as described herein.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the client and server components are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

Further, the framework functionality provided herein may be implemented as an adjunct or extension to an existing cloud compute management solution.

The techniques described herein may be used in virtual client-server environments.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows:

1. A method of securing tenant data in a multi-tenant computing infrastructure having a plurality of servers and that is used by a set of multiple tenants, comprising:
    partitioning the plurality of servers into a first set of one or more servers, and a second set of one or more servers, wherein servers in the first set operate in a first mode to provide non-data processing-specific actions, and wherein servers in the second set operate in a second mode to provide data processing-specific actions, at least one server in the first set shared among two or more tenants of the set of multiple tenants, at least one server in the second set uniquely associated with a particular tenant of the set of multiple tenants;
    in association with receipt from a client component of a request to a cloud application, establishing an encryption layer among the client component, a given server in the first set, and a given server in the second set; and
    during a request-response interaction between the client component and the cloud application, executing at least one data processing-specific action in the given server in the second set while executing at least one associated non-data processing-specific action in the given server in the first set.

2. The method as described in claim 1 wherein the servers in the first set of one or more servers provide non-data processing-specific actions concurrently for more than one tenant in the multi-tenant computing infrastructure.

3. The method as described in claim 1 wherein the encryption layer provides one of: session-specific encryption, and tenant-specific encryption.

4. The method as described in claim 1 wherein establishing an encryption layer includes generating at least one key adapted to secure communications among the client component and the given server in the first set.

5. The method as described in claim 4 wherein a data flow between the given server in the first set and the given server in the second set is also secured by the key.

6. The method as described in claim 1 wherein the servers are virtual machines in the computing infrastructure.

7. The method as described in claim 1 further including adjusting a number of servers in the second set as needed to handle the data processing requirements of the particular tenant.

* * * * *

UNITED STATES PATENT AND TRADEMARK OFFICE
CERTIFICATE OF CORRECTION

PATENT NO. : 9,917,818 B2
APPLICATION NO. : 14/503146
DATED : March 13, 2018
INVENTOR(S) : Christopher Michael Bosko et al.

Page 1 of 1

It is certified that error appears in the above-identified patent and that said Letters Patent is hereby corrected as shown below:

On the Title Page

Column 1, (72): Inventors: should read as follows:
... Christopher Michael Bosko, Durham, NC (US);
Bryan Daniel Osenbach, Cary, NC (US);
Jeffery B. Sloyer; Cary, NC (US);
Chelsea Christine Beerse; Fairport, NY (US) ...

Signed and Sealed this
Twenty-fourth Day of December, 2019

Andrei Iancu
*Director of the United States Patent and Trademark Office*